United States Patent
Amir et al.

(10) Patent No.: US 10,646,998 B2
(45) Date of Patent: May 12, 2020

(54) SYSTEM AND METHOD FOR OPTIMIZING RESOURCE USAGE OF A ROBOT

(71) Applicant: Intuition Robotics, Ltd., Ramat-Gan (IL)

(72) Inventors: Roy Amir, Ramat Gan (IL); Itai Mendelsohn, Ramat Gan (IL); Dor Skuler, Ramat Gan (IL); Shay Zweig, Harel (IL)

(73) Assignee: INTUITION ROBOTICS, LTD., Ramat-Gan (IL)

( * ) Notice: Subject to any disclaimer, the term of this patent is extended or adjusted under 35 U.S.C. 154(b) by 0 days.

(21) Appl. No.: 16/198,311

(22) Filed: Nov. 21, 2018

(65) Prior Publication Data

US 2019/0160670 A1 May 30, 2019

Related U.S. Application Data

(60) Provisional application No. 62/590,856, filed on Nov. 27, 2017.

(51) Int. Cl.
*B25J 9/16* (2006.01)

(52) U.S. Cl.
CPC ... *B25J 9/1653* (2013.01); *G05B 2219/32365* (2013.01); *G05B 2219/50391* (2013.01)

(58) Field of Classification Search
CPC ......... B25J 9/1653; G05B 2219/32365; G05B 2219/50391
See application file for complete search history.

(56) References Cited

U.S. PATENT DOCUMENTS

| | | | |
|---|---|---|---|
| 4,890,241 A * | 12/1989 | Hoffman | B25J 9/1676 700/255 |
| 5,801,945 A * | 9/1998 | Comer | G05B 19/41865 700/100 |
| 6,816,753 B2 | 11/2004 | Sakamoto et al. | |
| 6,975,970 B2 | 12/2005 | Thorisson | |
| 7,099,742 B2 | 8/2006 | Tajima et al. | |
| 7,129,667 B2 * | 10/2006 | Murakami | G11B 17/26 318/400.01 |

(Continued)

FOREIGN PATENT DOCUMENTS

WO 2017127850 A1 7/2017

OTHER PUBLICATIONS

International Search Report and Written Opinion of International Searching Authority for PCT/US2018/062276, ISA/RU, Moscow, Russia, dated Mar. 14, 2019.

*Primary Examiner* — Nicholas Kiswanto
(74) *Attorney, Agent, or Firm* — M&B IP Analysts, LLC

(57) ABSTRACT

A system and method for optimizing resource usage of a robot, the method including: receiving a first request to execute a first task, where the first task requires a first set of resources of the robot; causing the execution of the first task; receiving a second request to execute at least a second task, wherein the second task requires a second set of resources of the robot; determining whether any resources of the first set of resources and the second set of resources includes at least one overlapping resource; modifying at least one of the first task and the at least a second task when at least one overlapping resource is determined by omitting the at least one overlapping resource; and executing of the first task and the at least a second task as modified.

19 Claims, 3 Drawing Sheets

(56) References Cited

U.S. PATENT DOCUMENTS

| | | |
|---|---|---|
| 7,813,835 B2 | 10/2010 | Fujita et al. |
| 8,930,020 B2 | 1/2015 | Ouchi |
| 9,067,132 B1* | 6/2015 | Bergeron ............... A63F 13/06 |
| 9,415,505 B2 | 8/2016 | Ahn et al. |
| 9,489,181 B2 | 11/2016 | Kee et al. |
| 9,792,160 B2 | 10/2017 | Shear et al. |
| 10,032,137 B2* | 7/2018 | Skiba ................. G06Q 10/1097 |
| 2005/0197739 A1 | 9/2005 | Noda et al. |
| 2014/0316566 A1 | 10/2014 | Mazel et al. |
| 2015/0112480 A1* | 4/2015 | Nakata .................... B25J 19/06 |
| | | 700/245 |
| 2015/0367513 A1 | 12/2015 | Gettings et al. |
| 2017/0287760 A1* | 10/2017 | Yamamoto ........ H01L 21/67178 |
| 2019/0126942 A1* | 5/2019 | Goto .................... B60W 50/14 |

* cited by examiner

SYSTEM AND METHOD FOR OPTIMIZING RESOURCE USAGE OF A ROBOT

CROSS-REFERENCE TO RELATED APPLICATIONS

This application claims the benefit of U.S. Provisional Application No. 62/590,856 filed on Nov. 27, 2017, the contents of which are hereby incorporated by reference.

TECHNICAL FIELD

The present disclosure relates generally to robots, and more specifically to a method for optimizing and managing resources of social robots for increased efficiency.

BACKGROUND

Robots are autonomous devices designed for executing various tasks. Social robots are robots that are configured to interact with humans by following certain social behaviors and rules. The capabilities of such robots have recently increased as access to greater resources have become available. Current social robots are capable of identifying users' behavior patterns, learning users' preferences and reacting accordingly by generating electro-mechanical movements, responding to a user's touch or vocal commands with a mechanical or auditory response, and the like.

These capabilities enable social robots to be useful in many scenarios including interacting with patients suffering from various mental health issues, such as autism and stress problems, assisting users in initiating a variety of tasks, providing support for elderly persons, and the like. Social robots often use multiple hardware resources including microphones, speakers, display units, mechanical joints, servo-motors, and so on, to interact with the users.

One obstacle in implementing social robots effectively is the often suboptimal management of available resources, which can create a poor user experience, such as when two separate robot tasks are attempted to be executed simultaneously. For example, a first task of a social robot may require use of the speaker resource to ask the user a question, while a second task may attempt to use the same speaker to play music. The result is a diminished user experience.

While current solutions provide the ability to control various robotic resources, the increasing complexity of interactions between resources and capabilities of robotic systems presents new challenges.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for optimizing resource usage of a robot, the method including: receiving a first request to execute a first task, where the first task requires a first set of resources of the robot; causing the execution of the first task; receiving a second request to execute at least a second task, wherein the second task requires a second set of resources of the robot; determining whether any resources of the first set of resources and the second set of resources includes at least one overlapping resource; modifying at least one of the first task and the at least a second task when at least one overlapping resource is determined by omitting at the least one overlapping resource; and executing of the first task and the at least a second task as modified.

Certain embodiments disclosed herein also include a non-transitory computer readable medium having stored thereon instructions for causing a processing circuitry to perform a process, the process including: receiving a first request to execute a first task, where the first task requires a first set of resources of the robot; causing the execution of the first task; receiving a second request to execute at least a second task, wherein the second task requires a second set of resources of the robot; determining whether any resources of the first set of resources and the second set of resources includes at least one overlapping resource; modifying at least one of the first task and the at least a second task when at least one overlapping resource is determined by omitting at the least one overlapping resource; and executing of the first task and the at least a second task as modified.

Certain embodiments disclosed herein also include a system for optimizing resource usage of a robot, including: a processing circuitry; and a memory, the memory containing instructions that, when executed by the processing circuitry, configure the system to: receive a first request to execute a first task, where the first task requires a first set of resources of the robot; cause the execution of the first task; receive a second request to execute at least a second task, wherein the second task requires a second set of resources of the robot; determine whether any resources of the first set of resources and the second set of resources includes at least one overlapping resource; modify at least one of the first task and the at least a second task when at least one overlapping resource is determined by omitting at the least one overlapping resource; and execute of the first task and the at least a second task as modified.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
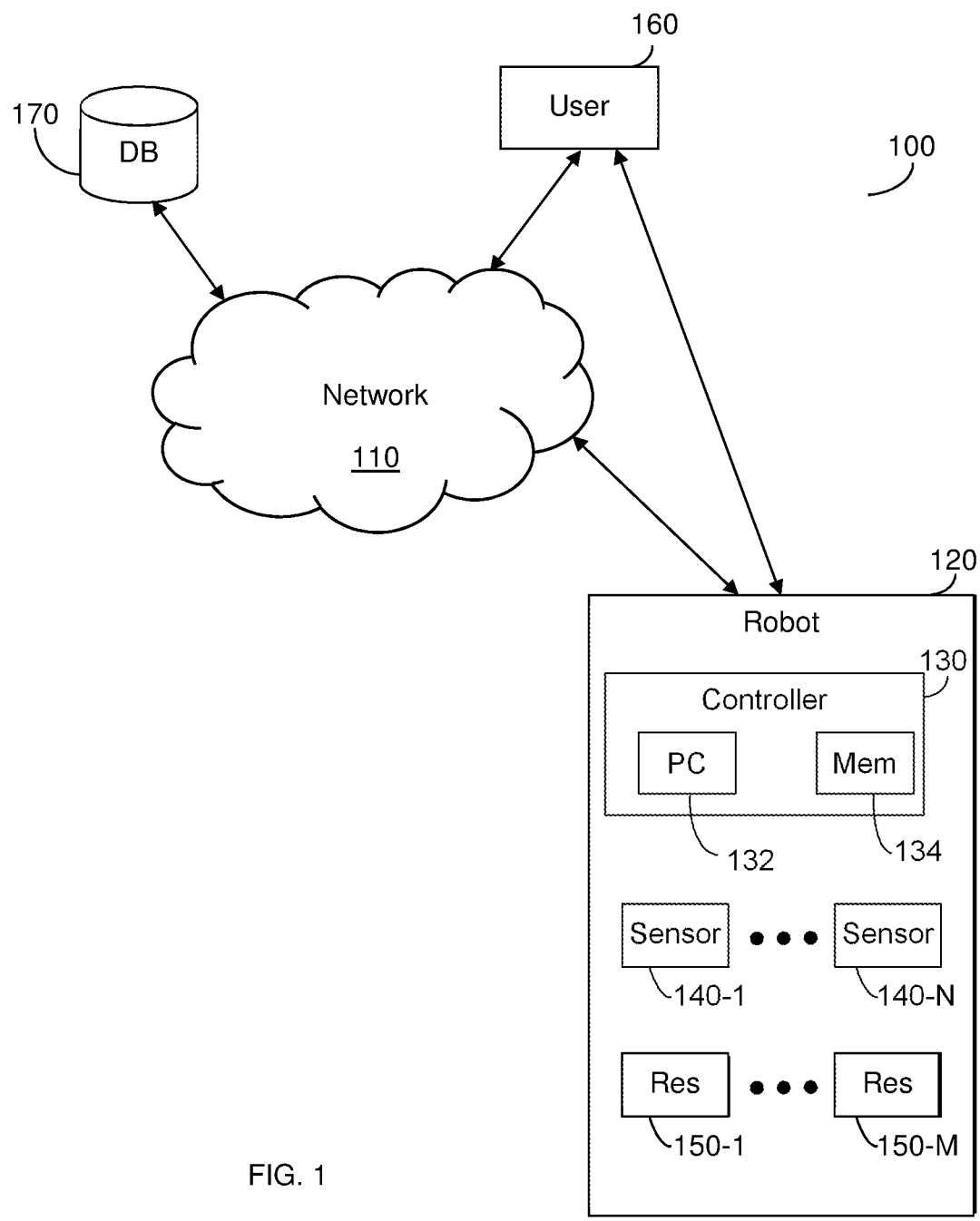
FIG. 1 is a network diagram of a robotic system according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for optimizing resource usage of a robot. The method includes managing resources of the robot with respect to multiple tasks or capabilities, e.g., a first task and second task of the robot, where each task employs at least one resource of the robot that makes the tasks possible. When there is an overlap between resources needed by the first task and the second task, the method determines which of the resources from the first task or the second task may be omitted from use. This is performed based on an analysis of a set of rules with respect to a prioritization scheme for the resources used by the first and second tasks, real-time data relating to the user of the robot, and the first and second tasks.

FIG. 1 is a network diagram of a robotic system 100 according to an embodiment. The robotic system 100 includes a robot 120 and a user 160. In some embodiments, the robot 120 is further connected to a network, where the network 110 is used to communicate between different parts of the robotic system 100. The network 110 may be, but is not limited to, a local area network (LAN), a wide area network (WAN), a metro area network (MAN), the Internet, a wireless, cellular or wired network, and the like, and any combination thereof. The user 160 may access the robot 120 directly, e.g., via a voice command or an input device connected directly to the robot 120, or indirectly through the network 110, e.g., through an application on a mobile phone connected to the internet, where the robot is additionally connected to the internet.

The robot 120 includes a controller 130, explained in more detail below in FIG. 2, having at least a processing circuitry 132 and a memory 134. The robot further includes one or more sensors 140-1 to 140-N, where N is an integer equal to or greater than 1 (hereinafter referred to as sensor 140 or sensors 140 merely for simplicity) and one or more resources 150-1 to 150-M, where M is an integer equal to or greater than 1 (hereinafter referred to as resource 150 or resources 150 merely for simplicity). The sensors 140 may include input devices, such as various sensors, detectors, microphones, touch sensors, movement detectors, cameras, and the like. The resources 150 may include display units, audio speakers, indicator lights, and the like. In an embodiment, the resources 150 may encompass sensors 140 as well. The robot 120 uses the controller 130, the sensors 140, and the resources 150 in order to execute various tasks. The robot 120 may include a device for performing emotional gestures to interact with a user, for example by utilizing a portion of the teachings of PCT Patent Application No. PCT/US18/12922, assigned to the common assignee and hereby incorporated by reference.

In one embodiment, the robotic system 100 further includes a database 170. The database may be stored within the robot 120 (e.g., within a storage device not shown), or may be separate from the robot 120 and connected thereto via the network 110. The database 170 may store one or more prioritization rules related to prioritization schemes for the sensors 140 and resources 150. The rules may indicate that a first resource 150, e.g. a display unit, is needed during the entire process of executing a first task, while a second resource, such as, a motor, is needed only during a certain period of execution of the first task. The rules may then allow the second resource to be used by other tasks outside of the period of execution where it is used in the first task.

According to another embodiment, the database 170 may have stored therein historical data associated with the user. The historical data may be retrieved from the database and used to determine resources usage for various tasks.

Figure 2:
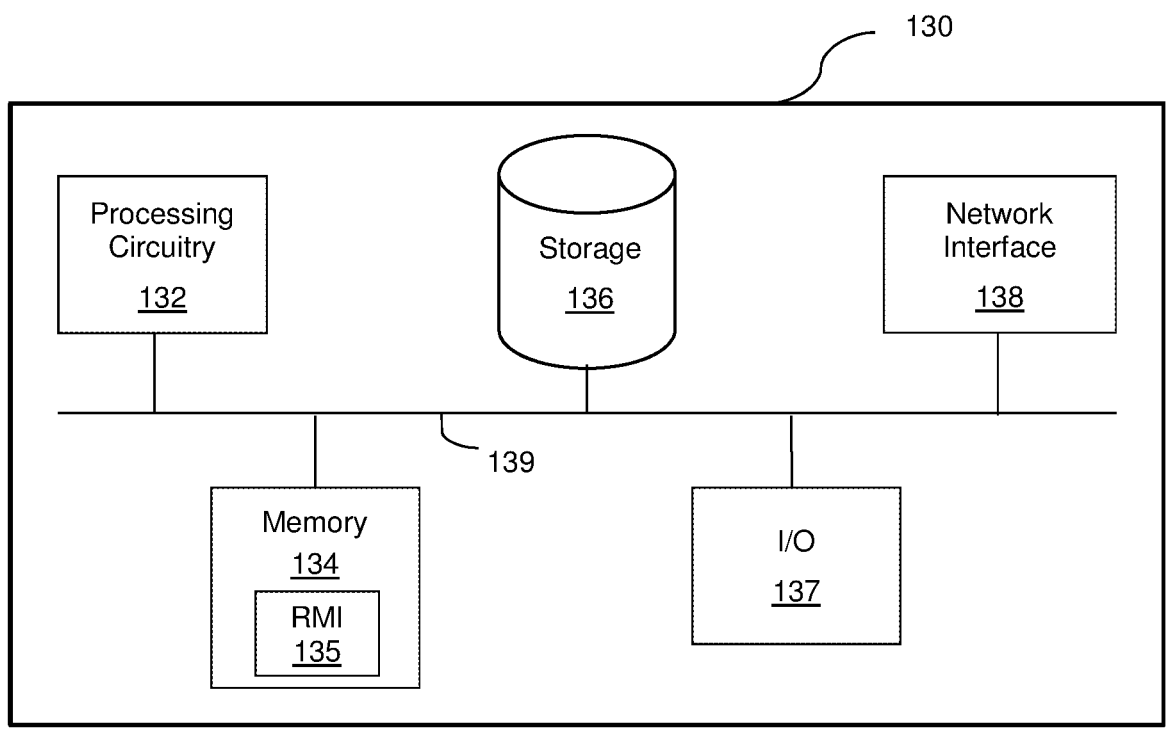
FIG. 2 is a block diagram of the controller of a robot according to an embodiment.

FIG. 2 shows an exemplary and non-limiting schematic block diagram of a controller 130 of a robot, e.g., the robot 120 of FIG. 1, according to an embodiment. The controller 130 includes a processing circuitry 132 configured to receive data, analyze data, generate outputs, and the like, as further described herein below. The processing circuitry 132 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The controller 130 further includes a memory 134. The memory 134 may contain therein instructions that, when executed by the processing circuitry 132, cause the controller 130 to execute actions as further described herein below. The memory 134 may further store therein information, e.g., data associated with rules related to prioritization of one or more resources, e.g., resources 150 or FIG. 1, of the robot 120. As discussed above, the resources 150 include means by which the robot 120 collects data related to a user, interacts with the user, and the like. For example, the resources 150 may be sensors, electro mechanical elements, display unit, speaker, and so on as further described herein.

The memory 134 further contains therein resource management instructions (RMI) 135 that may be executed by the processing circuitry 132 to achieve the control of the resources 150 as described in further detail herein. The RMI may include prioritization rules and is configured to prioritize the available resources 150 of the robot 120 used among various tasks. For example, but not by way of limitation, execution of the RMI 135 may result in allocated a first resource of the robot's 120 resources 150 for executing a certain task for a period of time determined to be necessary for execution of a specific task, when there is at least a partial overlap between usage of the first resource when two or more tasks of the robot 120 require that resource and are executed simultaneously.

In an embodiment, the controller 130 includes a network interface 138 configured to connect to the network 110. The network interface 138 may include, but is not limited to, a wired interface (e.g., an Ethernet port) or a wireless port (e.g., an 802.11 compliant WiFi card) configured to connect to a network (not shown).

The controller 130 further includes an input/output (I/O) interface 137 configured to control the resources 150 of the robot 120. The resources 150 may include, for example, electro-mechanical elements, sensors, detectors, display units, speakers, microphones, touch sensors, light sensors, movement detectors, cameras, and the like. In an embodiment, the I/O interface 137 is configured to receive one or more signals captured by sensors 140 of the robot 120 and send them to the processing circuitry 132 for analysis. According to one embodiment the I/O interface 137 is configured to analyze the signals captured by the sensors 140, detectors, and the like. According to a further embodiment, the I/O interface 137 is configured to send one or more commands to one or more of the resources 150 for executing one or more tasks or capabilities of the robot 120. According a further embodiment, the components of the controller 130 are communicatively connected via a bus 139.

According to an embodiment, the controller 130 is configured instruct the robot 120 to execute at least a first task, wherein the at least a first task utilizing a first set of resources 150 of the robot 120. The first task may be, for example, assisting a user in using a messaging application to contact a family member, playing music based on a user request, and the like.

The first set of resources 150 are means that allow the robot 120 to execute the first task. The resources 150 may include, but are not limited to, a microphone, a speaker, a display unit, a motor embedded within the robot that enables the robot to create a certain movement, and the like. As a non-limiting example, the controller 130 of the robot 120 may initiate a certain interaction with the user, such as suggesting the that user listen to music based on a previously stored user history. The task of suggesting the music and playing the music requires several resources 150, such as a microphone to collect the user's vocal command, a display for presenting visual elements, a speaker to play the music, and the like.

The controller 130 may be further configured to retrieve, e.g., from the memory 134, a database, e.g., the database 170 of FIG. 1, and the like, one or more rules related to a first prioritization scheme for the first set of resources 150. The rules may indicate that a resource 150, e.g. a display unit, is needed during the entire process of executing the first capability, while other resources, such as, a motor, is needed only during a certain period of the execution, after which the motor may be free to be used by other tasks. The first prioritization scheme is a plan that comprises the priority of each resource of the first set of resources 150 of the robot. Likewise, a second prioritization scheme, a third prioritization scheme, and the like are may be retrieved, where each prioritization scheme is associated with a specific set of resources and contains prioritization rules therein.

The controller 130 may be further configured to collect real time data associated with the user of the robot using the one or more sensors 140. The one or more sensors 140 may be for example, but not by way of limitation, a camera, a microphone, a motion detector, a proximity sensor, a light sensor, a touch detector, and the like, configured to sense and identify real time data associated with the user and the user's environment. The real time data is information that indicates, for example, the user's presence, the user's location, the user's state, user's environment, and so on.

Collecting the real time data allows the controller 130 to determine which of one or more tasks are to be executed. For example, if the user is identified as bored, the controller 130 may execute a task of playing music, suggest watching a lecture aligned with the user's interests, and the like. Thus, while executing a first task, a first set of resources is used and the controller 130 continues to collect real time data that may indicate that the use of additional resources are needed for additional tasks. According to one embodiment, the controller 130 may use historical data associated with the user instead of or in addition to the real time data. The historical data may be retrieved from one or more sources such as the memory 134, the database 170, and the like.

The controller 130 may be configured to determine when at least a second task utilizes a second set of resources 150 of the robot 120 having at least a partial overlap with the first set of resources 150. For example, a first task, e.g. playing a lecture, may use a display unit to display video content and a speaker to play audio content. According to the same example, a second task, e.g. suggesting the user to go through unread electronic mails, may also need the speaker and the display unit. Thus, the speaker and the display unit are resources that used by at least two tasks of the robot, and therefore these resources should be managed properly and prioritized to prevent poor user experience when the resources 150 are attempted to be accessed simultaneously.

As further non-limiting example, a first task may use a display unit and a motor of the robot 120, and a second task may require use of the display unit and audio speakers. That is to say, there is only one resource, i.e., the display unit, that creates a partial overlap between the resources of the first task and the second task.

The controller 130 is configured to analyze the retrieved one or more rules, e.g., based on the RMI 135, with respect to the first task and the second task. The controller 130 analyzes the prioritization rules that set the priority of each resource used by each of the first task and the second task with respect of the real time data that indicates at least one overlapping resource.

The prioritization rules may include task specific prioritization and inter-task prioritization. Task specific prioritization includes the importance and priority of resources used for one specific task. For example, for the task of reminding a user to take medication at a specific time of day, the prioritization rules may dictate that an auditory alert over a speaker has higher priority than a visual alert over a display. Thus, if a choice must be made between forgoing use of one of the two resources used for the medication reminder, use of the display is omitted, while use of the speaker is retained.

Inter-task prioritization includes which task is given priority to a resource, where two or more tasks demand use of that resource. For example, if three tasks require use of the audio speaker, e.g., reminder to take medication, playing of music, and receiving a phone, the prioritization rule may dictate that a reminder to take medication has highest priority, and thus use of the audio speaker is given to the medication reminder task first.

The analysis may include for example, comparing prioritization rules of a first resource needed to be in use along the entire execution of the first task, to prioritization rules of the first resource also needed to be in use along the entire execution of the second task. According to the same example, the analysis may further include using the result of the comparison together with the collected real time data to determine a second prioritization scheme.

Based on the analysis, the controller 130 determines a second prioritization scheme. The second prioritization scheme is a plan that includes the priority of each of the overlapping resources 150 of the first task and the at least a second task. The determined second prioritization scheme allows the first task and the at least a second task to continue functioning with at least one less resource from the overlapping resources 150. For example, the overlapping resources 150 of the first task and the second task may be the display unit and the speaker used for different purposes by each of the tasks. Based on the analysis, the controller 130 determines a second prioritization scheme of the resources of the first task that enables the first task to continue to sufficiently function without, e.g., the display unit. According to another non-limiting example, the controller 130 may determine a second prioritization scheme that influences the resources of the second task, and enables the second task to continue sufficiently functioning with at least one less resource from the overlapping resources.

Thus, the disclosed method described herein allow for an more efficient use of resources to enhance a user experience of robots by determining advanced prioritization schemes. The advanced prioritization schemes allow allocation of robot resources used by several robot's tasks without causing interruption to one of the resources or the tasks.

As a further non-limiting example, the method disclosed enables the robot to receive feedback from a user and simultaneously to keep playing music. As another non-limiting example, the method enables to determine that while the task of the robot playing music is active, the speaker resource shall not be interrupted; however, the display unit resource may be determined to be of secondary importance, and thus allowed to be interrupted by another task that requires use of the display, e.g., a task displaying received emails.

According to another embodiment, the controller 130 determines that a certain level of overlap between resources of a first running task and a second desired task, causes the second task not to be executed. According to the same embodiment, the controller 130 may configured to check whether at least one resource that is currently used by the first task and would be used by a second task if it is to be executed, is no longer in use by the first task. Upon determination that such a resource is available for use by the second task, the controller 130 executes the second task using the now available resource. According to the same embodiment, before the controller 130 executes the second task, the controller 130 determines, using real time data collected by the sensors of the robot, whether execution of the second task is still relevant.

According to yet a further embodiment, the controller 130 causes a second task to be executed instead of a first running task upon determination that an overlap between the resources of the first task and a second task crosses a predefined threshold. This may be determined if the second task is assigned a higher priority than the first task. The controller 130 may be configured to constantly check whether at least one resource, currently used by the second task and would be used by the first task, is no longer in use by the second task. Upon determination that such resource is available for use by the first task, the controller 130 executes the first task using the available resource. Before the controller 130 executes the first task, the controller 130 checks using real time data collected by the sensors of the robot whether the execution is still relevant.

It should be noted that the robot 120 may be a stand-alone device, or may be implemented in, for example, a central processing unit of a vehicle, computer, industrial machine, smart printer, and so on, such that the resources of the above-mentioned example devices may be used by the controller 130 to execute the actions described herein. For example, the resources of a vehicle may include a vehicle audio system, electric seats, vehicle center console, display unit, and the like.

Figure 3:
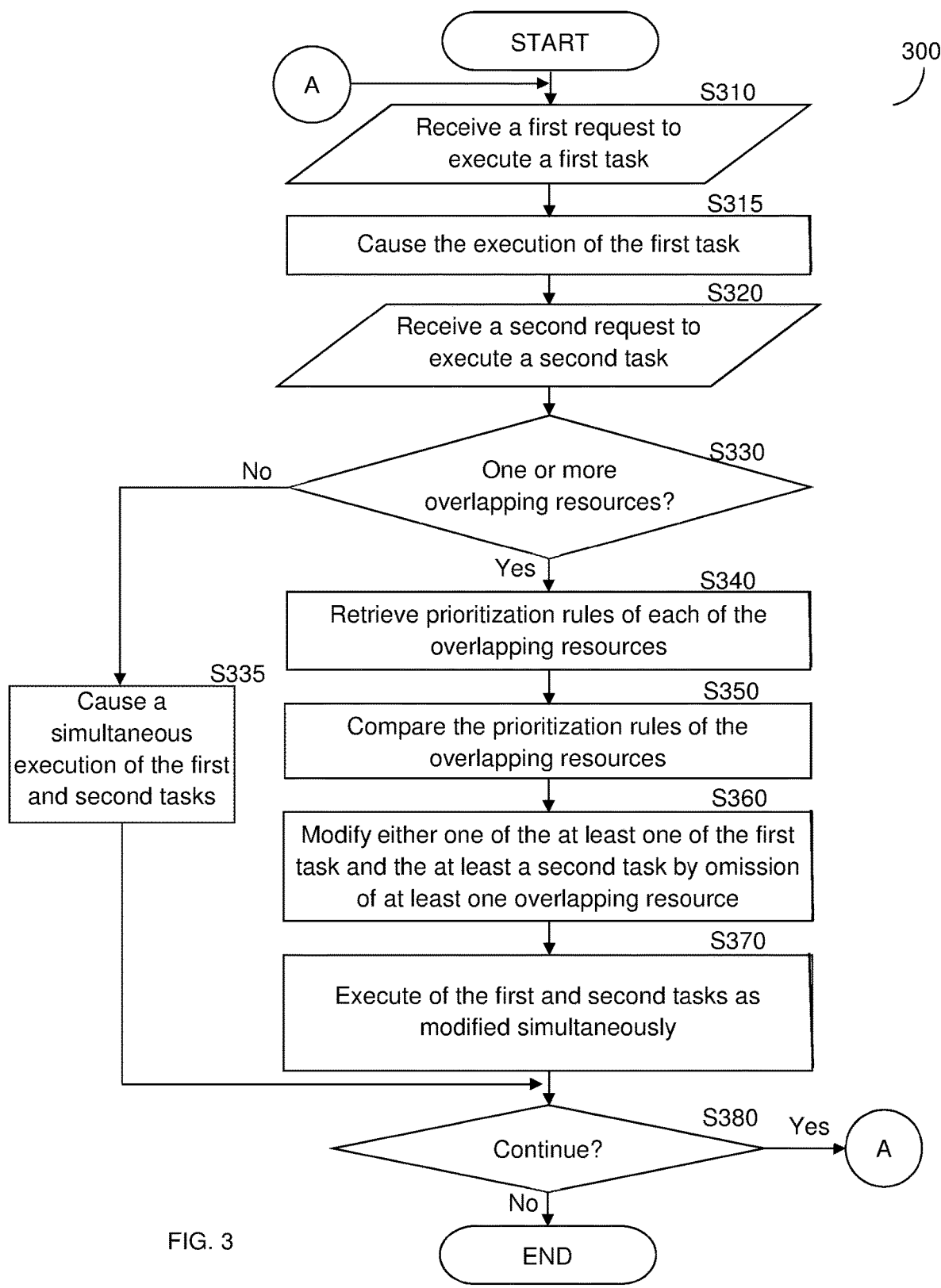
FIG. 3 is a flowchart of a method for optimizing resource usage of a robot according to an embodiment.

FIG. 3 shows a flowchart 300 of a method for optimizing resources usage of a robot to create an enhanced user experience according to an embodiment. At S310, a first request to execute a first task of the robot is received, e.g., by the controller 130. The first task utilizing a first set of resources of the robot. At S315, the first task is executed using a first set of resources. For example, the controller 130 uses a speaker, a microphone and a display unit of the robot for assisting a user to communicate with a family member using a messaging application.

At S320, at least a second request to execute at least a second task of the robot is received, where the at least a second task utilizes a second set of resources. If the first task and the second task use different and non-overlapping resources, the execution of the first task may not interrupt the execution of the second task and vice versa. If the first task requires at least some of the same resources needed by the second task, the execution of the first task and the second task may not be executed simultaneously.

In an embodiment, S320 further includes collecting real time data based on a user of the robot, the user's environment, using one or more sensors of the robot, such as, a microphone, a touch detector, a camera, and the like, as further described herein above with respect of FIGS. 1 and 2. Collecting real time data may occur prior to receiving the at least a second request, thus the second request may be influenced by the collected real time data.

At S330, it is determined whether there are one or more overlapping resources of the first task and the at least a second task, and if so, execution continues with S340; otherwise, execution continues with S335. At S335, the controller causes a simultaneous execution of the first task and the second task.

At S340, prioritization rules are retrieved, where the rules are associated with each of the overlapping resources of the first task and the at least a second task, from, e.g. a data source such as a prioritization scheme retrieved from a memory unit, a database, a cloud database, and the like, where the prioritization scheme includes prioritization rules for various tasks and pairing of tasks. At optional S350, prioritization rules of the overlapping resources of the first task is compared to the prioritization rules of the at least a second task.

As discussed above in FIG. 2, in an embodiment, the prioritization rules may include task specific prioritization and inter-task prioritization. The rules may dictate priority of several resources within a single task, as well as priority of several tasks using a single resource.

At S360, either one of the at least one of the first task and the at least a second task is modified to execute with the omission of at least one overlapping resource for one of the tasks. For example, when two different tasks use at least one identical resource, e.g. an audio speaker, the prioritization rules of the overlapping resource may indicate that the first task cannot omit the speaker, while the second task is able to omit the speaker and continue to function and execute satisfactorily.

In an embodiment, the modification includes implementation of the prioritization rules that indicate priority of a single resource used by two different tasks, as well as priority of one task over another. Additionally, real time data associated with the user or the user's environment may be used to determine which of the tasks needs to be given priority over the other. For example, the speaker is used by a first task for playing music, and simultaneously the speaker is needed by a second task for reminding the user to take user's medications. The priority of the speaker resource in both tasks may be identical, however the controller 130 may identify that the medication must be taken immediately based on the time of day. In addition, the collected real time data may indicate that the user is located in a different room so that a textual reminder will not be effective in this case. Therefore, the speaker resource may be allocated for reminding the user to take the user's medications.

At S370, the first task and the at least a second task as modified are executed simultaneously, where at least one task is executed using at least one less resource which has been determined to be omitted. As a non-limiting example, if the speaker resource is not necessary for the execution of a first task while the speaker is necessary for the execution of a second task that runs simultaneously, the second task may continue to, e.g., play music using the speaker while the first task continues to display unread e-mails without reading them to the user. At S380, it checked whether to continue the operation and if so, execution continues with S310; otherwise, execution terminates.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for optimizing resource usage of a robot, the method comprising:
   receiving a first request to execute a first task, where the first task requires a first set of resources of the robot;
   causing the execution of the first task;
   receiving a second request to execute at least a second task, wherein the second task requires a second set of resources of the robot;
   determining whether any resources of the first set of resources and the second set of resources includes at least one overlapping resource;
   modifying at least one of the first task and the at least a second task when at least one overlapping resource is determined by omitting at the least one overlapping resource; and
   executing of the first task and the at least a second task as modified.

2. The method of claim 1, further comprising:
   retrieving prioritization rules for each of the at least one overlapping resource of the first set of resources and the second set of resources; and
   comparing the prioritization rules of the least one overlapping resource.

3. The method of claim 2, wherein the prioritization rules are retrieved from a database.

4. The method of claim 2, wherein the prioritization rules include a task specific prioritization indicating a priority of resources necessary for a specific task.

5. The method of claim 2, wherein the prioritization rules include an inter-task prioritization indicating the priority of the first task over the at least a second task.

6. The method of claim 1, further comprising:
   collecting real time data associated with a user of the robot using one or more sensors; and
   determining priority of the first task and the at least a second task based on the real time data.

7. The method of claim 1, wherein omitting at least one overlapping resource includes determining if the first task or the at least a second task can execute without the overlapping resource.

8. The method of claim 1, wherein modifying at least one of the first task and the at least a second task includes allocating a first resource to either of the first task and the at least a second task for a period of time determined to be necessary for execution of a specific task.

9. The method of claim 1, wherein the resources include at least one of: electro-mechanical elements, sensors, detectors, display units, speakers, microphones, touch sensors, light sensors, movement detectors, and cameras.

10. A non-transitory computer readable medium having stored thereon instructions for causing a processing circuitry to perform a process, the process comprising:
    receiving a first request to execute a first task, where the first task requires a first set of resources of a robot;
    causing the execution of the first task;
    receiving a second request to execute at least a second task, wherein the second task requires a second set of resources of the robot;
    determining whether any resources of the first set of resources and the second set of resources includes at least one overlapping resource;
    modifying at least one of the first task and the at least a second task when at least one overlapping resource is determined by omitting at the least one overlapping resource; and
    executing of the first task and the at least a second task as modified.

11. A system for optimizing resource usage of a robot, comprising:
    a processing circuitry; and
    a memory, the memory containing instructions that, when executed by the processing circuitry, configure the system to:
    receive a first request to execute a first task, where the first task requires a first set of resources of the robot;
    cause the execution of the first task;
    receive a second request to execute at least a second task, wherein the second task requires a second set of resources of the robot;
    determine whether any resources of the first set of resources and the second set of resources includes at least one overlapping resource;

modify at least one of the first task and the at least a second task when at least one overlapping resource is determined by omitting at the least one overlapping resource; and execute of the first task and the at least a second task as modified.

12. The system of claim 11, wherein the system is further configured to:

retrieve prioritization rules for each of the at least one overlapping resource of the first set of resources and the second set of resources; and compare the prioritization rules of the least one overlapping resource.

13. The system of claim 12, wherein the prioritization rules are retrieved from a database.

14. The system of claim 12, wherein the prioritization rules include a task specific prioritization indicating a priority of resources necessary for a specific task.

15. The system of claim 12, wherein the prioritization rules include an inter-task prioritization indicating the priority of the first task over the at least a second task.

16. The system of claim 11, wherein the system is further configured to:

collect real time data associated with a user of the robot using one or more sensors; and determine priority of the first task and the at least a second task based on the real time data.

17. The system of claim 11, wherein omitting at least one overlapping resource includes determining if the first task or the at least a second task can execute without the least one overlapping resource.

18. The system of claim 11, wherein modifying at least one of the first task and the at least a second task includes allocating a first resource to either of the first task and the at least a second task for a period of time determined to be necessary for execution of a specific task.

19. The system of claim 11, wherein the resources include at least one of: electro-mechanical elements, sensors, detectors, display units, speakers, microphones, touch sensors, light sensors, movement detectors, and cameras.

* * * * *